July 15, 1952  J. C. DENIS  2,603,494
VACUUM CHECK VALVE
Filed June 18, 1947

INVENTOR.
JEAN CHARLES DENIS
BY
*Whittemore Hulbert & Belknap*
ATTORNEYS

Patented July 15, 1952

2,603,494

UNITED STATES PATENT OFFICE 2,603,494

VACUUM CHECK VALVE

Jean Charles Denis, Detroit, Mich., assignor, by mesne assignments, to Buffalo-Eclipse Corporation, a corporation of New York Application June 18, 1947, Serial No. 755,345

1 Claim. (Cl. 277—26)

The invention relates to vacuum systems such, for instance, as vacuum steam heating systems where the pressure within the system is at times lower than atmospheric pressure.

It is the object of the invention to provide means in such a system for retaining the vacuum in case of breakage of any part that might permit the inrush of air. More particularly, it is an object to provide means for retaining the vacuum in case of breakage of the gauge glass.

With these objects in view the invention consists in the construction of a check valve for incorporation in a vacuum system which remains open during the normal operation of such system but will automatically close when the vacuum is broken.

The invention further consists in a construction providing means for unseating said check valve after the break in the system is repaired and without material loss of the vacuum.

The invention further consists in the specific construction as hereinafter set forth.

A represents a casing forming a portion of a vacuum system and B a liquid gauge tube connected therewith. C is the fitting for connecting the lower end of the tube B to the casing A and which is provided with a valve D having an external handle E for shutting off connection with the tube B when the latter is to be replaced, this being the usual construction of gauge tube fittings.

To attain the object of my invention I form within the fitting C a chamber which is connected on one side thereof with a passage G leading into the casing A and on the other side a passage H leading to the gauge tube. Within the chamber F is placed a ball valve I which normally rests on the bottom of the chamber in a position to leave open both of the passages G and H. The passage G is surrounded by a seat J preferably in an inclined surface of the chamber. With the construction as thus far described, the liquid within the casing A will be in free communication with the gauge tube B through the passages G and H and chamber F. However, in case of the breaking of the tube B, etc., while the chamber within the casing A is under vacuum, the inrush of air through the broken tube and through the passage H impinging upon the ball I will instantly carry the latter to its seat J and with very little loss of vacuum in the system. If on the other hand the valve D were to be manually operated to cut off connection with the tube, the vacuum would be destroyed before this could be accomplished.

Figure 1:
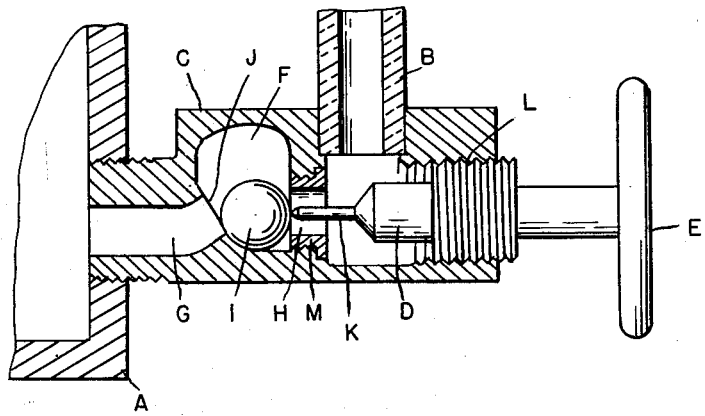
Fig. 1 is a vertical section through a portion of the vacuum system showing a fitting for connecting a gauge tube with the system and a vacuum check valve in open position.
Figure 2:
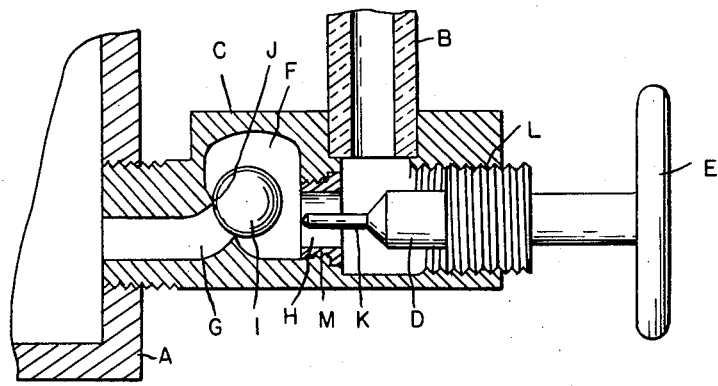
Fig. 2 is a similar view showing the check valve closed.
Figure 3:
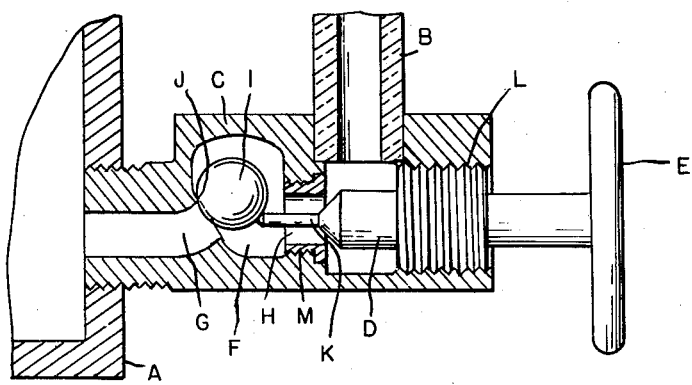
Fig. 3 is a similar view illustrating the means for unseating the check valve.

After the tube B has been replaced there may still be sufficient pressure in this portion of the system to hold the valve I to its seat. Therefore, I have provided means for displacing the ball comprising a pin K projecting from the valve member D and having a pointed end for bearing against the ball I below the center thereof. Thus, as shown in Fig. 3, the turning of the handle E will move the member D inward by reason of a threaded engagement L in the fittting and this will lift the ball off from the seat J. After pressures have been equalized between the casing A and the tube B the pin K may be withdrawn. This will permit the ball I to drop down into the normal working position shown in Fig. 1 leaving an open connection between the tube B and casing A.

To permit of inserting the ball I into the chamber F the passage H is originally of greater diameter than the ball, but is threaded to receive a bushing M. This bushing is engaged after the ball I has been introduced into the chamber.

What I claim as my invention is:

In a system including a working chamber held under less than atmospheric pressure, a casing having a laterally extending passage connecting with said chamber with two spaced enlargements in said passage, each having an annular valve seat therein surrounding the portion of the passage leading therefrom towards said chamber, a valve in the outer enlargement movable axially of said passage towards and from its valve seat, manually operable means outside said casing for actuating said valve, a ball valve in the other enlargement movable to its seat by an air current directed towards said chamber, and a pin projecting from and movable with the first valve while approaching its seat for eccentrically contacting said ball to displace the same from its seat.

JEAN CHARLES DENIS.

REFERENCES CITED

The following references are of record in the file of this patent:

UNITED STATES PATENTS

| Number | Name | Date |
|---|---|---|
| 719,842 | McCormick | Feb. 3, 1903 |
| 721,763 | Wehner | Mar. 3, 1903 |
| 865,151 | Andrew | Sept. 3, 1907 |
| 999,608 | Stucky | Aug. 1, 1911 |
| 1,339,383 | Beese | May 11, 1920 |
| 1,768,184 | Wolff | June 24, 1930 |

FOREIGN PATENTS

| Number | Country | Date |
|---|---|---|
| 26,074 | Great Britain | of 1902 |
| 702,668 | Germany | of 1941 |